United States Patent [19]
Uitz et al.

[11] 3,819,257
[45] June 25, 1974

[54] MOTION PICTURE APPARATUS

[75] Inventors: Mark O. Uitz, Mountain View; Edwin E. Ewry, Mill Valley; William T. Link; Hugh Paul Sherlock, both of Berkeley, all of Calif.

[73] Assignee: Action Films, Inc., Mountain View, Calif.

[22] Filed: Oct. 30, 1972

[21] Appl. No.: 301,763

[52] U.S. Cl............... 352/72, 352/129, 352/140, 40/86 A
[51] Int. Cl......................................... G03b 23/02
[58] Field of Search ............ 352/72, 129, 139, 140; 40/86 A, 86, 96; 95/45; 350/255, 235, 301; 353/26

[56] References Cited
UNITED STATES PATENTS

| | | | |
|---|---|---|---|
| 1,350,374 | 8/1920 | Michalk | 352/129 |
| 2,311,204 | 2/1943 | Bouma | 352/129 X |
| 2,449,483 | 9/1948 | Iwick | 352/129 |
| 2,451,544 | 10/1948 | Farrell | 352/129 |
| 2,455,187 | 11/1948 | Owens | 350/301 X |
| 2,866,383 | 12/1958 | Newcomer et al. | 350/255 X |
| 3,000,123 | 9/1961 | Hicks | 350/235 X |
| 3,180,207 | 4/1965 | Herrmann | 350/301 X |
| 3,672,604 | 6/1972 | Beaumont | 40/86 A X |
| 3,694,067 | 9/1972 | Clement | 353/26 X |
| 3,706,439 | 12/1972 | Skinner | 352/78 R |

FOREIGN PATENTS OR APPLICATIONS 1,549,332   11/1968   France .................. 352/129

Primary Examiner—Richard M. Sheer
Assistant Examiner—Alan Mathews
Attorney, Agent, or Firm—Flehr, Hohbach, Test, Albritton & Herbert

[57] ABSTRACT

Motion picture apparatus for use with a removable cartridge of the type which has a housing having a cavity formed therein with a rear opening in communication with the cavity whereby the cartridge can be inserted into the cavity and removed from the cavity through the rear opening. An optical assembly is mounted in the housing in front of the cartridge. Means in mounted in the housing for receiving light in a direction generally parallel to the optical axis and for directing it onto the cartridge.

13 Claims, 6 Drawing Figures

MOTION PICTURE APPARATUS

BACKGROUND OF THE INVENTION

In application Ser. No. 78,115, filed on Oct. 5, 1970, there is disclosed a motion picture apparatus with a removable cartridge. It has been found that for certain applications, this motion picture apparatus is unduly complicated and expensive to manufacture and produce. Also, it has been found that it is difficult, particularly for children, to insert and remove the cartridge from the same. There is, therefore, a need for a new and improved motion picture apparatus which overcomes the above-named disadvantages.

SUMMARY OF THE INVENTION AND OBJECTS

The motion picture apparatus is for use with a removable cartridge of the type having an aperture, a length of film disposed in the cartridge, means including a driven member exterior of the cartridge for advancing the film past the aperture in the cartridge and means within the cartridge for receiving light and directing light toward the aperture. The motion picture apparatus comprises a housing having a cavity formed therein with the rear opening in communication, with the cavity whereby the cartridge can be inserted into the cavity and removed from the cavity through the rear opening. An optical assembly is mounted in the housing in front of the aperture in the cartridge when the cartridge is in the housing and has an optical axis in alignment with the aperture. Means is mounted in the housing for receiving light in a direction parallel to the optical axis and for directing it onto the means within the cartridge for receiving light.

In general, it is an object of the present invention to provide a motion picture apparatus which has a simplified construction.

Another object of the invention is to provide a motion picture apparatus of the above character which can be inexpensively reproduced.

Another object of the invention is to provide a motion picture apparatus of the above character in which the cartridge can be readily inserted and removed.

Another object of the invention is to provide a motion picture apparatus of the above character in which the cartridge can be inserted by a straight-in motion and removed by a straight-out motion.

Another object of the invention is to provide a motion picture apparatus of the above character in which the cartridge cannot be inserted incorrectly.

Another object of the invention is to provide a motion picture apparatus of the above character in which the viewing brightness has been improved.

Another object of the invention is to provide a motion picture apparatus of the above character in which the magnification provided has been increased.

Another object of the invention is to provide a motion picture apparatus of the above character which will gather light for viewing purposes in a direction which is in line with the motion picture apparatus.

Another object of the invention is to provide a motion picture apparatus of the above character which can be readily focused without removing the eye from the apparatus.

Another object of the invention is to provide a motion picture apparatus of the above character in which the eyepiece cannot be removed.

Another object of the invention is to provide a motion picture apparatus of the above character which is provided with a pistol-grip type handle and headrest area to facilitate steady, comfortable holding of the apparatus.

Another object of the invention is to provide a motion picture apparatus of the above character which cannot readily be broken.

Another object of the invention is to provide a motion picture apparatus which has an attractive and modern appearance.

Additional objects and features of the invention will appear in the following description in which the preferred embodiment is set forth in detail in conjunction with the accompanying drawings.

DESCRIPTION OF THE PREFERRED EMBODIMENT

Figures 1, 6:
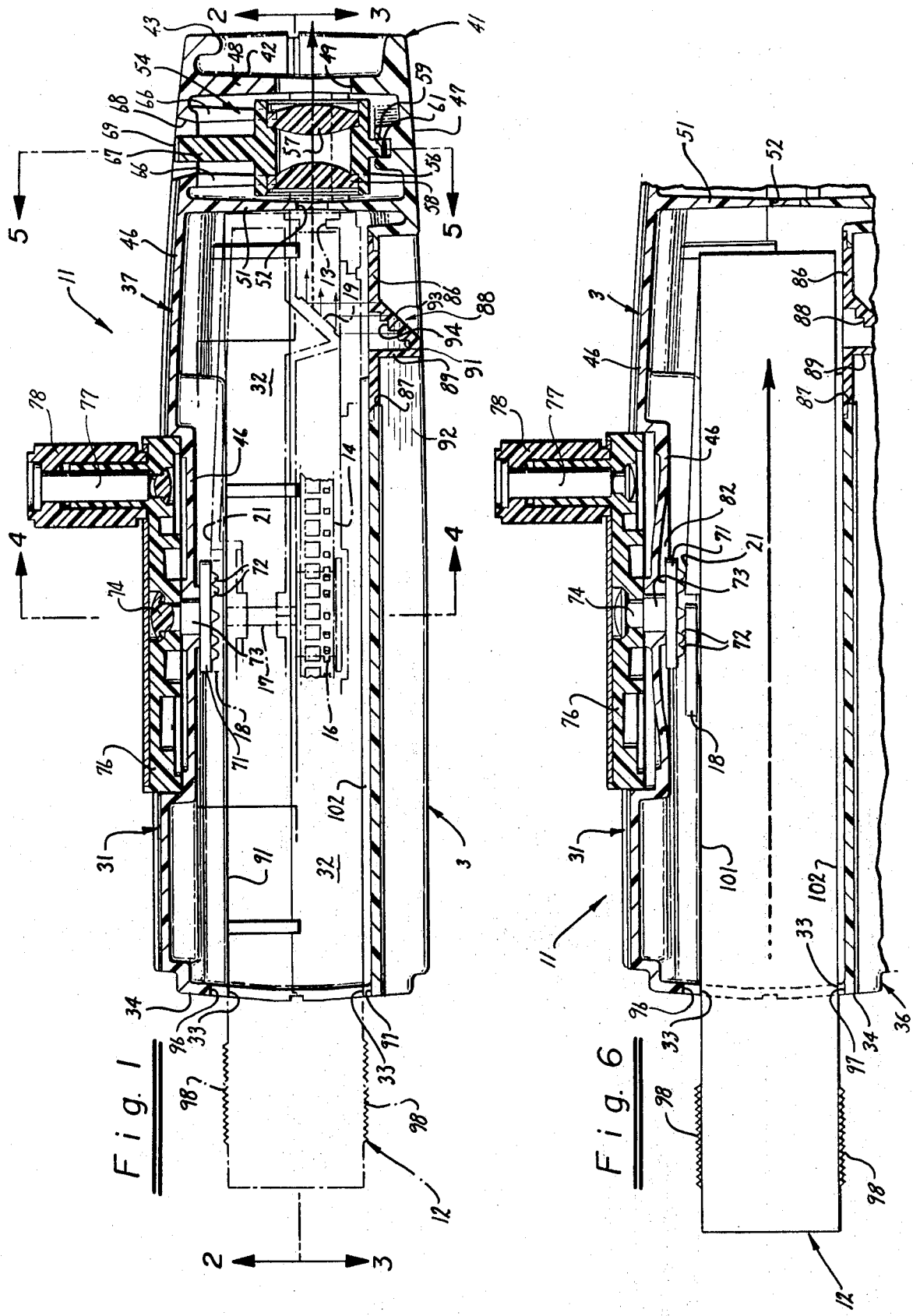
FIG. 1 is a cross sectional view of a motion picture apparatus incorporating the present invention.
FIG. 6 is a cross sectional view similar to FIG. 1 showing a cartridge being inserted into the motion picture apparatus and the manner in which the drive member carried by the housing is moved outwardly by the cartridge by deforming the side wall of the housing of the motion picture apparatus.

The motion picture apparatus shown in the drawing is in the form of a viewer 11 which is adapted to be utilized in conjunction with a removable cartridge 12. The cartridge 12 is of the type described in co-pending application Ser. No. 78,115, filed Oct. 5, 1970. As described therein, the cartridge or magazine 12 is provided with an aperture 13. A length of film 14 is disposed within the cartridge and is advanced by a sprocket 16. The sprocket 16 is connected by shaft 17 to a driven member 18 carried exterior of the cartridge. The driven member 18 is utilized for driving the sprocket 16 to advance the film past the aperture 13 provided in the cartridge. The cartridge is also provided with means for directing light onto the film in the aperture 13 and consists of light directing means in the form of a mirror 19 disposed within the cartridge. The cartridge is formed with an inclined ramp exterior of the cartridge which has its upper end adjacent the driven member 18.

The viewer 11 consists of a housing 31 which is provided with a cavity 32 that is accessible through an opening 33 in a rear wall 34 of the housing to permit the cartridge 12 to be inserted into the cavity 32 and removed from the cavity 32 through the rear opening 33. The housing is formed in two parts, 36 and 37, which are both basically halves of the housing. These parts 36 and 37 can be formed of any suitable material, such as plastic, by the use of relatively simple molds. The parts 36 and 37 are fastened together by suitable means, such as ultrasonic bonding. The housing is generally rectangular and is provided with a pistol-grip type handle 39 extending downwardly and inclined slightly toward the rear from the bottom of the housing.

The housing 31 is formed to provide an eyepiece 41 which is formed integral with the housing. The eyepiece is formed with a generally dish-shaped recess 42 which is surrounded by a relatively large, gently curved surface 43 that is adapted to be placed against the eye while the viewer is being held by the hand. The housing 31 is provided with spaced generally parallel side walls 46 and 47 which extend into and join with the eyepiece 41. A wall 48 defines the bottom of the recess 42 in the eyepiece 41 and is provided with an opening 49 that may be viewed by the eye when the eyepiece 41 is placed adjacent to the eye. The housing 31 is also provided with an additional wall 51 generally parallel to the wall 48. The wall 51 is provided with an aperture 52 that is in axial alignment with the opening 49 and which is also in alignment with the aperture 13 provided in the cartridge 12 when the cartridge 12 is within the right cavity 32.

Figure 5:
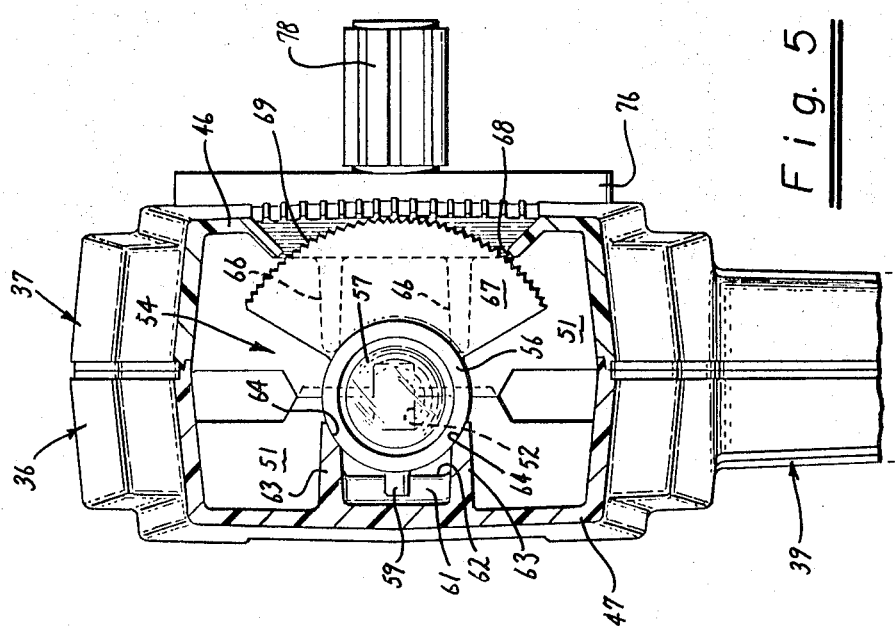
FIG. 5 is a cross sectional view taken along the line 5—5 of FIG. 1.

An optical assembly 54 is provided in the housing 31 between the wall 48 and the wall 51 and has its optical axis in alignment with the axes of the opening 49 and the aperture 52. The optical assembly 54 consists of a barrel-like member 56 that has a pair of lenses 57 and 58 mounted in opposite ends thereof. The barrel-like member 56 is formed with a small projection 59 extending radially from the outer surface of the member. The projection 59 travels in a groove or recess 61 that is inclined at an angle with respect to the optical axis of the optical assembly and which is defined by a pair of spaced parallel ribs 62. The ribs 62 are formed integral with a pair of the spaced additional longitudinally extending parallel ribs 63 which extend inwardly from the wall 47. The ribs 63 are provided with surfaces 64 that engage the barrel-like member 56 (see FIG. 5). Four spaced finger-like projections 66 extend outwardly from the opposite wall 46 and frictionally engage opposite upper and lower surfaces of the barrel-like member 56 so that the barrel-like member is frictionally retained between the ribs 63 and the projections 66. The barrel-like member 56 is provided with a wing-like projection or knob 67 that extends outwardly from the surface of the barrel-like member 56 opposite the projection 59. The wing-like projection or knob 67 extends through an elongate slot 68 provided in the side wall 46. An arcuate surface 69 provided on the wing-like projection or knob 67 is knurled as shown (see FIG. 5). The wing-like projection 67 extends sufficiently far through the slot 68 so that it can be readily engaged by a finger to cause rotation of the barrel-like member and to thereby cause movement of the projection 59 in the inclined slot or groove 61 to change the axial position of the barrel-like member to adjust the focus of the optical assembly 54 with respect to the image formed in the aperture 52. The projections 67 which have a spring-like characteristic serve to frictionally engage the barrel-like member 56 and thereby retain the optical assembly 54 in the position to which it has been moved by engagement of the wing-like projection or knob 67.

Means is provided for driving the driven member 18 carried by the magazine or cartridge 12 and consists of a disc-like member which is carried by the side wall 46. The disc-like drive member 71 is provided with a plurality of rounded bumps 72 which are arranged in a circle near the outer margin of the inner surface of the drive member 71. The bumps 72 are adapted to engage rounded depressions (not shown) provided in the driven member 18 of the cartridge 12. The disc-like drive member 71 is provided with an integral hub 73 which is rotatably mounted in the side wall 46. A stub shaft 74 is formed integral with the hub 73 and is secured to a large disc or wheel 76 which is disposed outside the wall 46. A pin 77 is mounted on the wheel and carries a knurled knob 78 which is rotatably mounted thereon. The wheel 76, in combination with the knob 78, provides a crank whereby the drive member 71 can be rotated by hand to cause rotation of the driven member 18 of the cartridge 12.

Figure 2:
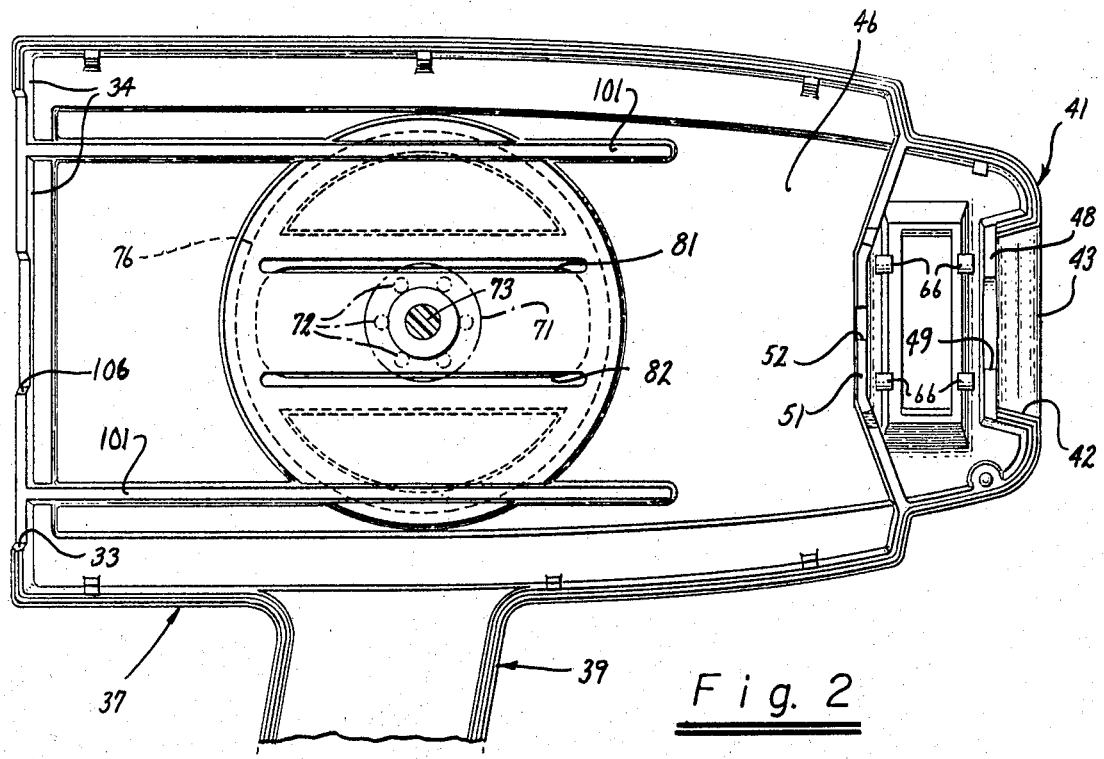
FIG. 2 is a cross sectional view taken along the line 2—2 of FIG. 1.
Figure 3:
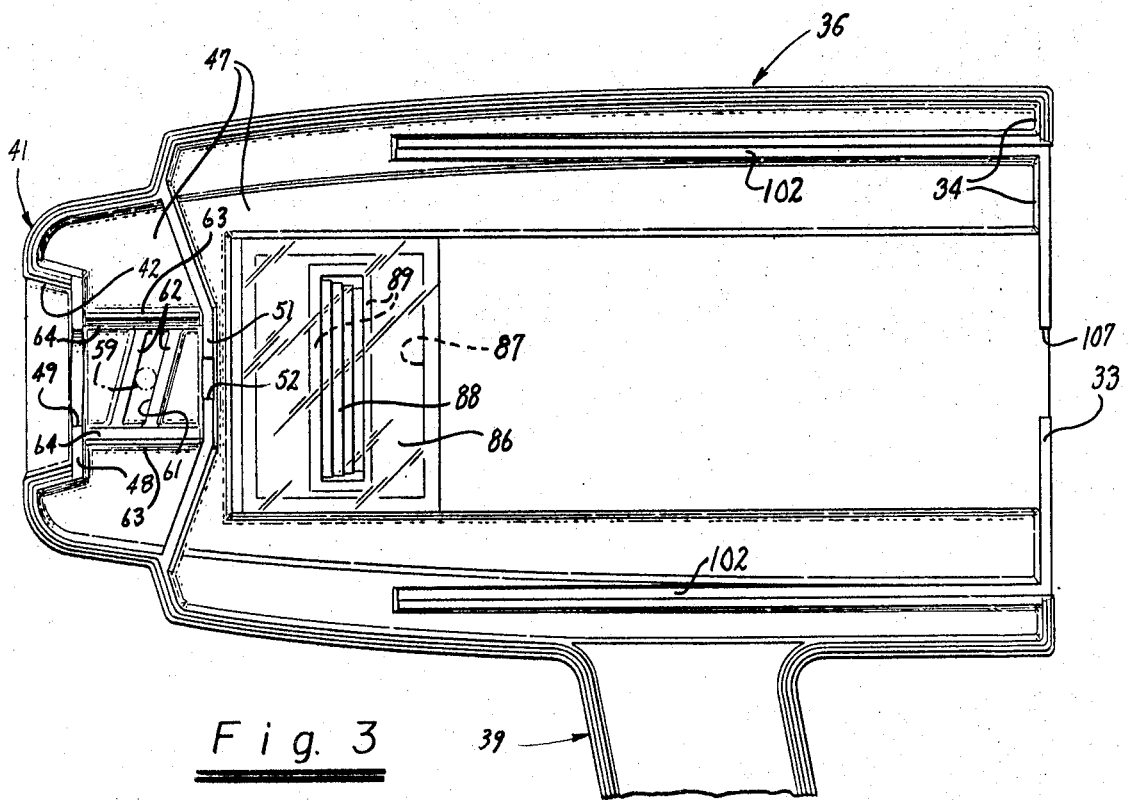
FIG. 3 is a cross sectional view taken along the line 3—3 of FIG. 1.

The portion of the side wall 46 through which the disc-like member 71 extends is formed in such a manner that it can readily be deformed outwardly as shown in FIG. 6. For this purpose, the side wall 46 has been weakened by providing a pair of elongate spaced generally parallel slots 81 and 82 extending longitudinally of the side wall 46 and being positioned generally above and below the drive member 71. As can be seen from FIG. 2, the length of the slots 81 and 82 is such that they do not extend beyond the large disc or wheel 76 so that they cannot be seen by the user of the viewer after it has been assembled. The wall thickness of the side wall 46, the length and width of the slots 81 and 82 should be such that the disc-like member 71 can be readily moved outwardly by deforming a portion of the side wall carrying the drive member 71 as shown in FIG. 6.

The viewer is provided with means for receiving light from a direction in which the viewer would be pointed by the user when the user has placed the eyepiece 41 against the eye which then directs the light onto the light receiving means 19 provided in the cartridge 12. This is accomplished by providing a rectangular insert or window 86 formed of a suitable clear plastic material mounted in the side wall 47. The side wall 47 is formed in such a manner that there is provided a recess 87 generally equi-distant the upper and lower surfaces of the side wall 37 and extending longitudinally of the side wall 37 to the rear from the eyepiece 41. The insert is formed with an integral totally internally reflecting prism 88. The prism 88 is formed with a plurality of steps 89 which have surfaces 91 that are normal to incoming light rays 92. The light rays 92 are reflected through 90° by surface 93 of the prism 88 as indicated in FIG. 1. The surface 93 extends at an angle of approximately 45° with respect to the wall 47. The steps 89 have surfaces 94 that are normal to the reflected light rays. The insert 86 is transparent and has no significant effect upon the incoming light rays. The light rays 92 merely pass through the same and strike the prism 88 as hereinbefore described. Thus, it can be seen that the prism 88 serves to receive light coming from the rear of the viewer and to reflect the same through 90°. The reflected light rays are then reflected by the mirror 19 through 90° and onto the film in front of the aperture 13 provided in the cartridge 12.

The construction of the prism 88 hereinbefore described is particularly advantageous in that it permits the insert 88 to be molded from a relatively thin plastic. With the construction shown, it is not necessary to provide a solid prism which would be difficult to mold since it would have a tendency to shrink and become distorted so that it would not have a precise prism shape which is required. By utilizing the step-type construction, it is possible to provide a wall thickness which is relatively thin so that the shrinkage during cooling will not appreciably affect the dimensional accuracy of the prism. As is well known to those skilled in the art, it is only necessary that the surfaces 91 and 94 be normal to the light rays and that surface 93 be at an angle of 45° to such rays to obtain the effect of a prism.

Figure 4:
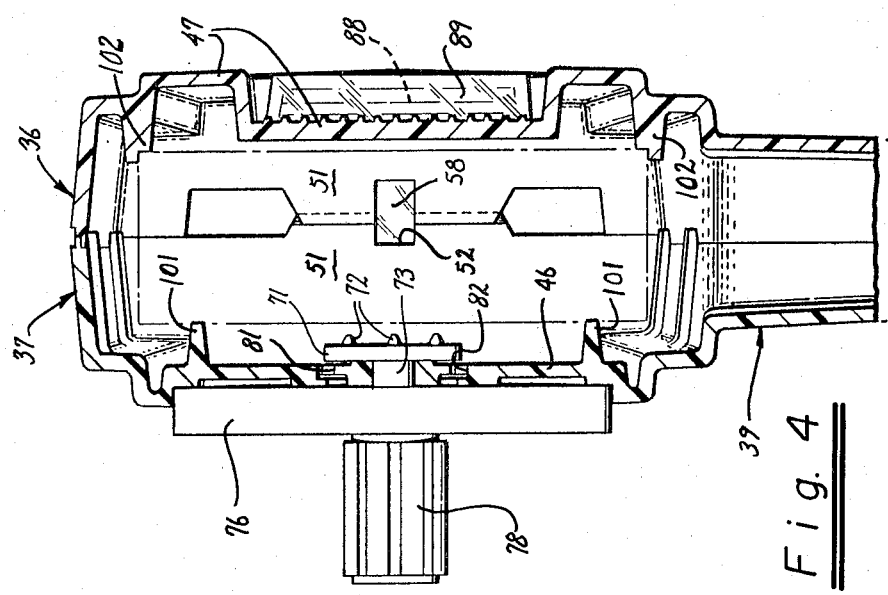
FIG. 4 is a cross sectional view taken along the line 4—4 of FIG. 1.

The viewer 11 and the cartridge 12 are formed in such a manner that the cartridge cannot be inserted incorrectly. For this purpose, the cartridge is provided with a draft, that is, its sides are slightly inclined in one direction and the cavity 32 formed within the body is also provided with such an inclination so that the cartridge can only be inserted with the sides of the cartridge facing in the proper direction, that is, with the driven member 18 facing to the left and with the other side of the cartridge adapted to receive the light facing to the right when viewing the viewer from the rear. The side wall 46 is provided with spaced parallel ribs 101 (see FIGS. 2 and 4) which are adapted to engage one side of the cartridge. The corners on the opposite side of the cartridge are adapted to be engaged by spaced parallel ribs 102 formed integral with the wall 47. Thus, it can be seen that the cartridge 12 is firmly held in place within the cavity 32 provided within the housing 31.

The rear wall 34, in addition to being provided with the opening 33, is provided with a cut out 106 which is adapted to accommodate the ramp 21 and the driven member 18 carried by the cartridge as the cartridge is slipped into the cavity 32 through the opening 33. Similarly, the rear wall 34 is also provided with another cut out 107 to accommodate the raised portion (not shown) of the cartridge 12 on the other side of the cartridge 12. The cartridge 12 is provided with raised serrations 108 (see FIG. 6) on the rear extremity on the opposite side walls which are adapted to be engaged by the hand to facilitate insertion and removal of the cartridge into the housing. In addition, they prevent the cartridge from being inserted with the wrong end forward.

Operation of the motion picture apparatus may now be briefly described as follows.

A cartridge 12 which carries a length of film which is to be viewed is inserted into the viewer 11 by holding the viewer in one hand and the cartridge in the other hand and pushing the cartridge forward in a straight line as indicated by the arrow in FIG. 6. As the cartridge moves inwardly, the ramp 21 will engage the drive member 71 and will force the drive member 71 outwardly against the yieldable force provided by the portion of the side wall 46 between the slots 81 and 82 as shown in FIG. 6 to permit the drive member 71 to move over the top of the driven member 18 and engage the drive member 18 as the cartridge is moved to the fully inserted position.

As soon as the cartridge has been inserted, the pistol grip handle 39 can be grasped with one hand and the viewer placed in a position so that the eyepiece 41 is adjacent an eye of the viewer. Normally, the user of the viewer will point the viewer in a direction where the most light is coming from, such as a lamp or a window. This light will travel down through the recess 87 where it will strike the prism 88 and be reflected internally in a direction which is 90° from the incoming light rays toward the mirror 19 where it is again reflected through another 90° toward the aperture 13 and onto the film in front of the aperture. The user, utilizing the other hand, will then grasp the knob 78 and rotate the disc 76 which will cause rotation of the drive member 81, which in turn will rotate the driven member 18. This causes the sprocket 16 to be rotated which will advance the film 14 past the aperture to provide motion pictures to the viewer.

During operation of the viewer, the user can readily adjust the focus provided by the optical assembly 54. This can be accomplished by using one finger to engage the wing-like projection 67 to position the optical assembly to achieve the desired focus.

From the foregoing, it can be seen that the present viewer has many advantages. Although the optical assembly is relatively simple, magnification up to twenty times can readily be obtained. Excellent viewing brightness can be obtained by the use of ambient light. Most efficient use of ambient light is obtained when the viewer is pointed in the direction so that the light will travel down the recess 87 and strike the prism 88. However, light at other angles than from the rear can enter directly through other portions of the window-like insert 86 and is diffused thereby and then strikes the mirror 19 after which it is directed onto the film. This viewing brightness is maintained even though the user may accidentally place a hand over the window-like insert 86 because the light can still come through the recess 87 and strike the lens 88. The eyepiece of the viewer is formed integral with the viewer and therefore cannot be removed. As explained previously, focusing can be accomplished by the use of one finger without removing the viewer from the eye. The eyepiece is provided with a relatively large surface so that there is no danger of damaging the eye in the event that the viewer is bumped accidentally into the eye. The pistol grip handle makes it possible to use the viewer and hold it steady while the crank is being utilized for advancing the film.

As explained previously, the cartridge and the viewer are formed in such a manner that the cartridge cannot be inserted incorrectly. The cartridge can be inserted and removed by straight-line movements without the necessity of camming or moving the same to the side.

The viewer has a modernistic and utilitarian appearance. It is formed basically in two halves which are bonded together to provide a viewer which is resistant to breakage because of the hoop strength. This high hoop strength is achieved because there are relatively few flat surfaces but many curved surfaces which provide rigidity. The internal ribs which are utilized for guiding the cartridge also serve to strengthen the housing. The pistol grip provided for the housing is formed so that it adds to the appearance of the housing.

The viewer is formed in such a manner that it can be readily and economically manufactured. It also has a relatively small number of parts.

We claim:

1. In a motion picture apparatus for use with an exterior source of light and for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the apparatus comprising a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the housing, and having an optical axis in alignment with the aperture and means mounted in the housing for receiving light from an external source in a direction generally parallel to the optical axis and for directing it through a substantial angle onto the means within the cartridge for receiving light to make the image on the film visible to the eye, said housing having a side wall with a recess formed therein extending longitudinally of the side wall substantially parallel to the optical axis, said means mounted in the housing for receiving light including a member disposed in said recess.

2. Apparatus as in claim 1 wherein said member has at least a portion thereof in the form of a prism.

3. Apparatus as in claim 2 wherein said member is formed of a totally internally reflecting prism.

4. Apparatus as in claim 1 wherein said housing is formed with an eyepiece integral with the housing, said eyepiece having an opening therein in alignment with the optical axis of the optical assembly.

5. Apparatus as in claim 4 wherein said eyepiece has a relatively large frontal surface adapted to be engaged by the eye of the user.

6. Apparatus as in claim 1 wherein said housing is provided with a pistol type handle.

7. In a motion picture apparatus for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the viewer comprising a housing having a cavity formed therein with the rear opening in communication with the cavity whereby the cartridge can be inserted into the cavity and then removed from the cavity through the rear opening, an optical assembly mounted in the housing in front of the aperture in the cartridge when the cartridge is in the housing and means mounted in the housing for the receiving of light and directing it onto the means within the cartridge for receiving light, said optical assembly including a barrel-like member, lens means carried by the barrel-like member, said housing having a side opening therein, a wing-like knob secured to the barrel-like member and extending through the opening in the side wall of the housing so that the knob can be engaged by the finger of the viewer to adjust the focus of the optical assembly.

8. Apparatus as in claim 7 together with cooperative means carried by the housing and the barrel-like member adjusting the optical assembly longitudinally of the optical axis as the wing-like member is shifted in its position.

9. Apparatus as in claim 8 wherein said cooperative means in the form of an inclined recess and a projection extending into the recess.

10. In a motion picture apparatus for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the apparatus comprising a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the housing, and having an optical axis in alignment with the aperture and means mounted in the housing for receiving light in a direction parallel to the optical axis and for directing it onto the means within the cartridge for receiving light, said housing being provided with a side wall, said means mounted in the housing for receiving light including a member for reflecting incoming light at an angle of approximately 90°, said member having at least a portion thereof in the form of a totally internally reflecting prism, said prism being formed of plastic and having internal steps having surfaces normal to incoming and reflected light.

11. In a motion picture apparatus for use with an exterior source of light and for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the apparatus comprising a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the housing, and having an optical axis in alignment with the aperture said housing being provided with a side wall, said means mounted in the housing for receiving light including a member for reflecting incoming light at an angle of approximately 90°, said side wall being provided with a recess extending longitudinally of the side wall, said means for receiving light being disposed in said recess.

12. In a motion picture apparatus for use with an exterior source of light and for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the apparatus comprising a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the housing, and having an optical axis in alignment with the aperture said housing being provided with a side wall, said side wall having a window formed therein, said window being formed of a transparent material and having a portion thereof in the form of a member for reflecting incoming light at an angle of approximately 90° with respect to the plane of the side wall.

13. In a motion picture apparatus for use with an exterior source of light and for use with a removable cartridge of the type having an aperture, a length of film disposed in the cartridge, means including a driven member exterior of the cartridge for advancing the film past the aperture in the cartridge and means within the cartridge for receiving light and directing light toward the aperture, the apparatus comprising a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the housing, and having an optical axis in alignment with the aperture said optical assembly including a barrel-like member mounted in said housing forward of said cavity, lens means carried by the barrel-like member and a wing-like knob carried by said barrel-like member and extending through said housing and adapted to be engaged by a finger to permit rotation of the barrel-like member to adjust the focus of the optical assembly.

* * * * *